United States Patent

[11] 3,619,140

| [72] | Inventors | Allan C. Morgan<br>Winchester;<br>Merrill E. Jordan, Walpole, both of Mass. |
|---|---|---|
| [21] | Appl. No. | 606,665 |
| [22] | Filed | Jan. 3, 1967 |
| [45] | Patented | Nov. 9, 1971 |
| [73] | Assignee | Cabot Corporation<br>Boston, Mass. |

[54] PROCESS FOR MAKING CARBON BLACK
3 Claims, 2 Drawing Figs.

[52] U.S. Cl. ............................................... 23/209.4,
23/209.2, 23/259.5, 23/277, 23/142, 23/182, 23/202
[51] Int. Cl. ................................................ C09c 1/50
[50] Field of Search ........................................ 23/209.4, 209.6, 259.5, 277

[56] References Cited
UNITED STATES PATENTS

| 2,659,662 | 11/1953 | Heller | 23/209.4 |
| 2,623,811 | 12/1952 | Williams | 23/209.6 |
| 2,769,692 | 11/1956 | Heller | 23/209.4 |
| 2,851,337 | 9/1958 | Heller | 23/209.4 |
| 3,102,790 | 9/1963 | Perry | 23/259.5 |
| 3,256,065 | 6/1966 | Latham | 23/259.5 |
| 3,256,066 | 6/1966 | Higgins | 23/259.5 |

*Primary Examiner*—Edward J. Meros
*Attorney*—Kenneth W. Brown

ABSTRACT: A process is provided for making high-quality carbon blacks at unusually good yields in a highly compact reaction space. The key steps of the process are the generation of a very hot combustion gas stream moving at very high speed in essentially plug flow by burning a hydrocarbon gas in oxygen in a compact combustion zone under conditions of very high heat release assuring the attainment of temperatures of over 3,000° F. and the transverse injection into said high-speed combustion stream from the periphery thereof of a plurality of individual streams of liquid hydrocarbon make, each of which is injected under sufficient pressure to cause same to enter said high-speed combustion stream at a linear velocity of more than about 100 feet per second. Preferably, a highly oxygen-enriched oxidant is used to burn the hydrocarbon gas.

PROCESS FOR MAKING CARBON BLACK

This invention relates to a novel burner for carrying out combustion. The invention further relates to processes for making pyrogenic solids which processes utilize the aforesaid novel burner. In particular, the invention relates to novel processes and apparatus for making carbon black.

Almost all commercial carbon black is presently provided by those major processing techniques i.e. the channel process, furnace process, and thermal process. Each of these processes have certain limitations and result in blacks having unique properties which distinguish them from the blacks produced by other processes.

Channel blacks have high rubber-reinforcing ability and extremely good color intensity. The most intense color is obtained with blacks having a diameter of about 90 angstroms, and intenseness of the color gradually decreases as the particle diameter increases. The color of furnace black usually ranges from a scale of about 84 to 96 and is less intense than the color of black produced by the channel process described above. However, structure as determined by ability to reinforce rubber, is greater in the blacks produced in the furnace process than those produced by the channel process. Thermal blacks have a much larger particle size than either channel or furnace blacks, less rubber-reinforcing ability than either channel or furnace blacks, and relatively poor color properties. What makes the thermal blacks useful at all is the fact that their low surface area and spherical particle shape adapts them for easy incorporation in elastomers and use as fillers. Other types of carbon black cannot be incorporated into plastics in anywhere near the high loadings obtainable by use of thermal blacks.

The blacks having darker color are much more expensive to produce than an equivalent quantity of thermal black.

It is seen from the above that each carbon black process produces a black having particularly distinguishable physical properties and also having distinguishable economic limitations.

The economic limitations are primarily due to the necessity of operating at very high "percent combustion" when low scale, i.e. high color, carbon blacks are manufactured.

The term "percent combustion" is, as will be understood by those skilled in the art, a measure of the oxygen made available during a given run relative to the amount required to satisfy the complete oxidation of hydrocarbons present in the carbon-forming zone to carbon dioxide and water.

In a number of commonly owned and copending applications (i.e. Ser. Nos. 560,524 now abandoned, 560,705, now U.S. Pat. No. 3,443,901 filed June 27, 1966 by Wendell, Jordan, Burbine and Shelvey and 560,771 filed June 27, 1966 by Jordan, Wendell, Dannenberg and Hardy and since refiled as Ser. No. 817,262), a number of novel and compact apparatus and processes have been disclosed useful for among other things, utilizing oxygen-enriched combustion to facilitate production of a variety of novel carbon blacks and also to produce a very wide range of blacks having properties which include both those normally associated with channel blacks and those normally associated with furnace blacks.

While a principal object of the instantly disclosed invention is to provide apparatus and processes for improving oxygen-enriched carbon-black processes still further, the instant invention is based on utilization of novel burner apparatus which may also be advantageously utilized in other chemical processing arts ranging from the carrying out of combustion reactions to achieve an extraordinary concentration of heat output to the advantageous production of pyrogenic chemicals like titania, alumina and the silica.

Thus, it is an object of the invention to provide an extraordinary compact and high-rate burner capable of achieving extremely high heat release within a very limited space.

Secondly, it is an object of the invention to provide means for producing, at very high rates, pyrogenic products such as pyrogenic oxides and carbon black.

It is a further object of the invention to provide a burner that performs substantially adiabatically when utilized for combustion of hydrocarbon with oxygen.

Moreover, it is a further object of the invention to provide means for controlling the properties of carbon black produced by the process of the invention and, in particular, means for controlling the structure, surface area, and color properties of the black.

A further object of the invention is to achieve this control with relatively little sacrifice in economical operation of the carbon-forming process.

Other objects of the invention are in part obvious or in part set forth below.

Applicants have achieved their objects by combining a vortex-type burner capable of operation at an extremely high combustion rate with a unique reactant feeding method.

In the specification and in the accompanying drawings are shown and described an illustrative embodiment of the invention; modifications thereof are indicated, but it is to be understood that these are not intended to be exhaustive nor limiting of the invention, but on the contrary are given for the purposes of illustration in order that others skilled in the art may fully understand the invention and the manner of applying it in practical applications. The various objects, aspects and advantages of the present invention will be more fully understood from a consideration of the specification in conjunction with the accompanying drawings.

Figure 1:
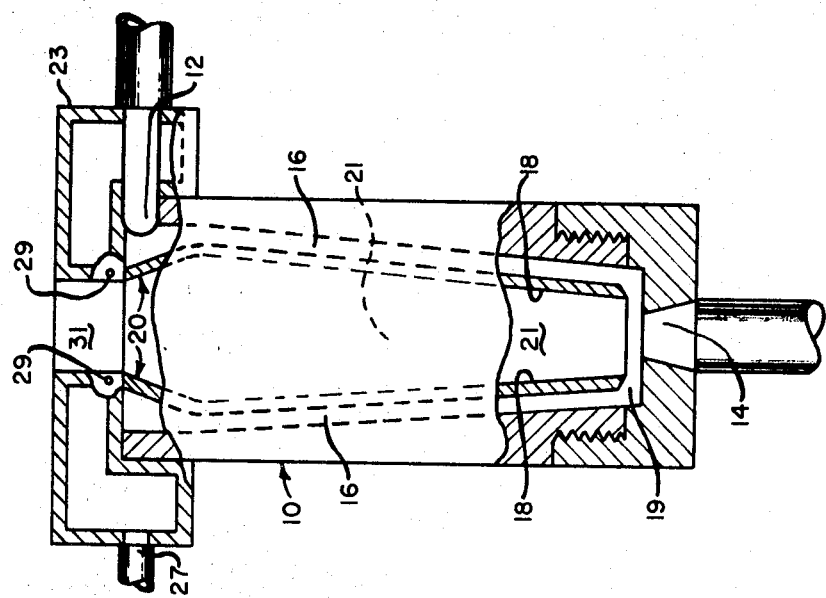
FIG. 1 is an elevation, partially in section, of a vortex burner of the invention.

Referring to FIG. 1, it is seen that the apparatus described therein comprises a burner 10 having a tangential entry port 12 and an axial port 14. Port 12 feeds into an annular frustoconical flow path 16 which discharges into throat section 19 of burner 10. Walls 18 of burner 10 diverge upwardly at divergent angle of about 5° with the vertical before converging to form a relatively narrow outlet 2 through which combustion gases may exit from the enclosed combustion chamber 21.

An astonishing advantage of the high combustion rate burner illustrated in FIG. 1 is that extraordinarily high heat output per unit volume is achievable. For example, heat outputs of between $5 \times 10^8$ and $10 \times 10^8$ B.t.u. per hour per cubic foot have been achieved when utilizing this burner with oxygen and hydrocarbon gas feed.

In a typical example, with 800 cubic feet per hour of natural gas having a fuel value of 1,000 B.t.u. per cubic foot and 1,600 cubic feet per hour of oxygen. The heat output of the burner was calculated at 800,000 B.t.u. per hour and $5.6 \times 10^8$ B.t.u. per hour per cubic foot of burner volume.

Moreover, this high heat output is achieved with a largely adiabatic operation. Thus an even larger concentration of heat than might ordinarily be expected from the indicated massive heat release is delivered to the outlet of the burner.

It has been discovered that high heat release obtainable from burners such as that illustrated in FIG. 1 are particularly useful in the production of pyrogenic materials.

For such uses, it has been found particularly advantageous to have combustion products from burner 10 carried through an adjacent reactant-injection member 23 mounted immediately at outlet 20.

Member 23 comprises a cylindrical reactant feed chamber into which reactants are supplied through conduit 27. Three holes 29 are spaced around reacting injection zone 31 formed by member 23. It is through these holes 29 that reactants are radially injected at high velocities into zone 31. It has been found that such high velocities promote rapid dispersal and evaporation of the injected reactant in the stream of combustion products.

Among pyrogenic materials which can be formed in the apparatus are carbon black, and such metallic oxide as silica, titania and alumina; for example a hydrolizable salt of titania and alumina; for example a hydrolizable salt of titanium such as $TiCl_4$ may be converted to titania.

In the formation of carbon black it has been found to be especially desirable to inject the oil through holes 29 at an average linear velocity of more than about 100 feet per second. Average linear velocity of the combustion products at outlet 20 is desirably at least about 3,500 feet per second. This velocity is approximately at MACH 1 and is temperature dependent.

The high oil injection velocity not only prevents the smearing of injected reactant along the walls of injection zone 31 but also promotes the rapid dispersal and/or evaporation of the reactant.

It has been discovered that the high-velocity gas flow and high heat concentrations achievable when the instant invention is utilized allows an extremely rapid dispersal and evaporation of hydrocarbon feedstock injected around the periphery of zone 31. Furthermore the turbulent plug flow downstream of the hydrocarbon injection area enables a more definite and uniform quench of the carbonaceous product. Thus, the large amount of recirculation present in conventional furnaces is entirely avoided.

In a typical embodiment of the invention, for example in each of working examples 1 through 5, the nozzle is of the solid-cone (30° angle) spray pattern type and has an orifice of about 0.025 inches diameter. In some applications, the spinner assembly of the nozzle can be removed and the 30° cone is transformed into a stream. The nozzle used in working examples 1 through 5 is sold under the trade designation WDB series by the Delavan Company, and has nominal discharge capacities of 2.8 gallons per hour at 40 p.s.i.g., 3.9 gallons per hour at 75 p.s.i.g., 5 gallons per hour at 125 p.s.i.g., and 10 gallons per hour at 500 p.s.i.g.

These nozzle characteristics are described here only to complete the description of the apparatus used and to indicate the type of velocities required to avoid coking of heavy hydrocarbons when injected into zone 31. Small holes without nozzles are also usefully employed and are preferred for injection into higher velocity gas streams.

Quench nozzles were of similar design but of approximately twice the capacity for a given pressure.

Aromatic HB is a typical carbon-black make oil and has been used in all of the working examples. An analysis of an Aromatic HB sample follows:

| A.P.I. Gravity | +13.1 |
|---|---|
| Viscosity, S.S.U. (130° F.) | 33 |
| Viscosity, S.S.U. (210° F.) | 31 |
| % Asphaltenes | 0.12 |
| % Ash | 0.002 |
| % Sulfur | 0.15 |
| H/C Ratio | 1.15 |

| % Distilled | Boiling Point |
|---|---|
| Initial Boiling Point | 419° F. |
| 10% | 443 |
| 20% | 447 |
| 30% | 450 |
| 40% | 455 |
| 50% | 459 |
| 60% | 466 |
| 70% | 472 |
| 80% | 480 |
| 90% | 498 |
| End Point | 550 |

Figure 2:
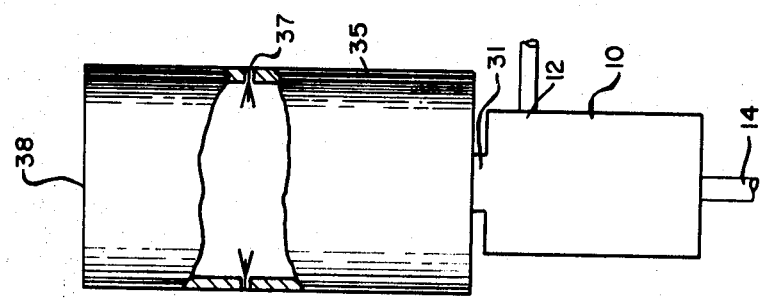
FIG. 2 is a schematic elevational view of the burner of FIG. 1 in conjunction with further elements forming novel apparatus useful in the manufacture of pyrogenic materials.

Referring to FIG. 2, it is seen that an oxidizing gas and a fuel gas are admitted to burner 10 through conduits 14 and 12 respectively. The oxidizing gas and fuel gas react to form an extremely hot and highly turbulent, but essentially a plug flow, of gases into injection zone 31 formed of member 23. Into this injection zone 31 through holes 29 is injected carbon-black make which is transformed into a vaporous or gaseous material almost immediately. Pressures in zone 31 usually range from above about 0 to about 50 p.s.i.g. Temperatures range from about 3500° to about 5,000° F. Velocities upstream of the oil injection reach about 2,000 to about 3,500 f.p.s. Under such conditions unusually large concentrations of small, highly unstable carbon black-forming species are created. It is believed that the unique advantages of the instant process are in large part attributable to these concentrations which are extraordinary not only in respect to the number found per unit volume but also in respect to mole percent to total atoms present in the decomposition products present in, and effluxing from, zone 31.

Efflux from zone 31 passes into integrated reaction zone 35 and is quenched therein by water quench spray emanating from nozzles 37. It is a particular advantage of the process thus described that a great measure of control can be exerted over the carbon-black product thereof by controlling the average residence time in which the carbon-forming species are exposed to the heat flux in zone 31 and until the efflux from the zone is subjected to initial quenching.

EXAMPLE 1

The apparatus shown in FIG. 2 and described above was utilized to make carbon black. The furnace reaction zone was 6 inches in diameter and 76 inches in length. One quench nozzle sold under the trade designation Spraying Systems 300215 was positioned axially at the end of the furnace to spray 20 gallons per hour of water.

The make oil was preheated to 250° F. Oxygen (1,600 standard cubic feet per hour) and natural gas (800 standard cubic feet per hour) were combusted in the burner of FIG. 1 and passed into zone 31. The preheated carbon-black make oil was injected into zone 31 at a rate of 12.5 gallons per hour.

The make oil was injected at a pressure 120 p.s.i.g. to assure its rapid evaporation at a position sufficiently remote from the hot walls of zone 31 to avoid any coking thereupon.

The "percent combustion" was 29.1. Yield was 35 percent based on total carbon feed.

The black obtained is hereafter identified as Black A.

EXAMPLE 2

The apparatus shown in FIG. 2 and described above was utilized to make carbon black. The furnace reaction zone was 2.5 inches in diameter and 36 inches in length. The same quench technique was used as for working example 1.

The make oil was preheated to 245° F. Oxygen (1,600 standard cubic feet per hour) and natural gas (800 standard cubic feet per hour) were combusted in the burner of FIG. 1 and passed into zone 31. The preheated carbon-black make oil was injected into zone 31 at a rate of 12.5 gallons per hour.

The make oil was injected at a pressure of 100 p.s.i.g. to assure its rapid evaporation at a position sufficiently remote from the hot walls of zone 31 to avoid any coking thereupon.

The "percent combustion" was 29.1. Yield was 40 percent based on total carbon feed.

The black obtained is hereafter identified as Black B.

EXAMPLE 3

The apparatus shown in FIG. 2 and described above was utilized to make carbon black. The furnace reaction zone was 1 inch in diameter and 13 inches in length. Four nozzles were positioned peripherally to spray 6.5 gallons of water each at the end of the furnace.

The make oil was preheated to 250° F. Oxygen (1,600 standard cubic feet per hour) and natural gas (800 standard cubic feet per hour) were combusted in the burner of FIG. 1 and passed into zone 31. The preheated carbon-black make oil was injected into zone 31 at a rate of 12.5 gallons per hour.

The make oil was injected at a pressure 200 p.s.i.g. to assure its rapid evaporation at a position sufficiently remote from the hot walls of zone 31 to avoid any coking thereupon.

The "percent combustion" was 31.2. Yield was 31.3 percent based on total carbon feed.

The black obtained is hereafter identified as Black C.

EXAMPLE 4

The apparatus shown in FIG. 2 and described above was utilized to make carbon black. The furnace reaction zone was 1 inch in diameter and 13 inches in length. Four quench nozzles were positioned peripherally to spray about 6.5 gallons per hour of water each at a position 13 inches down the furnace from the injection zone.

The make oil was preheated to 250° F. Oxygen (1,600 standard cubic feet per hour) and natural gas (200 standard cubic feet per hour) were combusted in the burner of FIG. 1 and passed into zone 31. The preheated carbon-black make oil was injected into zone 31 at a rate of 16.7 gallons per hour.

The make oil was injected at a pressure 260 p.s.i.g. to assure its rapid evaporation at a position sufficiently remote from the hot walls of zone 31 to avoid any coking thereupon.

The "percent combustion" was 31.2. Yield was 35.8 percent based on total carbon feed.

The black obtained is hereafter identified as Black D.

EXAMPLE 5

The apparatus shown in FIG. 2 and described above was utilized to make carbon black. The furnace reaction zone was 1 inch in diameter and 20 inches in length. Four quench nozzles were positioned peripherally to spray about 8 gallons per hour of water each at a position 13 inches down the furnace from the injection zone.

The make oil was preheated to 250° F. Oxygen (1,600 standard cubic feet per hour) and natural gas (200 standard cubic feet per hour) were combusted in the burner of FIG. 1 and passed into zone 31. The preheated carbon-black make oil was injected into zone 31 at a rate of 16.7 gallons per hour.

The make oil was injected at a pressure 280 p.s.i.g. to assure its rapid evaporation at a position sufficiently remote from the hot walls of zone 31 to avoid any coking thereupon.

The "percent combustion" was 31.2. Yield was 35.6 percent based on total carbon feed.

The black obtained is hereafter identified as Black E.

The following table lists the physical characteristics of the carbon blacks the production of which has been illustrated by the foregoing working examples:

TABLE

| | Scale | Percent volatiles | Surface area, M²/gram | Percent extract | Percent DBP absorption | Tint | DPG absorption | $L_c$ | $L_a$ |
|---|---|---|---|---|---|---|---|---|---|
| Black A | 85 | 1.3 | 70.7 | 0.8 | 186 | 162 | 7.4 | 14.9 | 36.3 |
| Black B | 82 | 1.1 | 116.9 | 0.7 | 145 | 232 | 18.6 | 11.6 | 34.9 |
| Black C | 79 | 5.2 | 86.9 | 3.7 | 106 | 164 | 36.0 | | |
| Black D | 79 | 2.0 | 116.2 | 0.7 | 136 | 170 | 22.1 | | |
| Black E | 80 | 2.7 | 101.5 | 0.7 | 140 | 220 | 33.0 | | |

A number of extraordinary and surprising results are obtained in studying the properties of Blacks A through E together with the processing techniques by which they were produced.

For example, the only important difference in the production of Blacks A, B and C was the decreasing residence time of the carbon as measured between injection of the oil make and quenching of the black. This time was controlled by reducing the size of reaction zone 35 and positions of quench nozzles 37. It will be noted that the scale of the black falls from 85 to 82 and then to 79 as this residence time is reduced. However, Black C does have higher volatiles and extract than Blacks A and B. This fact, where it interferes with the performance of the black can be overcome (most surprisingly) by a large increase in the oil to gas ratio used in the process. Thus when the oil is increased from 12.5 to 16.7 gallons per hour and the natural gas is decreased from 800 to 200 cubic feet per hour as between examples 3 and 4, the extract content of the black produced drops from 3.7 percent to 0.7 percent as seen by comparing Blacks C and D. This is an extraordinary discovery for it not only allows the production of a low-scale black having a low extract but also provides means for vastly increasing the carbon-black production rate of a give installation.

A further important and advantageous discovery is evident from a comparison of working examples 4 and 5 and Blacks D and E produced thereby. Thus, the apparatus of example 5 differed from that used in example 4, only in the provision of an additional 7 inch long section 38 downstream of the quench nozzles 37, as illustrated in FIG. 2.

While the process of the invention has been illustrated with respect to a particular apparatus, it will be clear to those skilled in the art from the description of the process that other apparatus can be contrived for carrying out the process. The important criteria to be preserved are 1. The establishment of very hot combustion gases, at least 3,00° F.
2. A very rapid velocity for shearing the carbon-black make, advantageously about MACH 1 or more.
3. A sufficiently high rate of carbon-black make fuel added to the combustion gases to provide a very high concentration of atoms in the carbon-forming zone.

What is claimed is:

1. A process for making high-quality carbon black at unusually good yields and high volumetric production rates comprising
   a. burning a hydrocarbon gas in oxygen in a compact combustion zone under high-intensity conditions so as to generate a stream of combustion gases having a temperature of over 3,000° F. and moving in essentially plug flow as it leaves the downstream end of said combustion zone at an exit velocity of at least about 2,000 feet per second,
   b. injecting transversely into said exiting stream of hot combustion gases from the periphery thereof a plurality of individual streams of hydrocarbon liquid make under sufficient pressure to cause same to enter said exiting stream at a linear velocity of more than about 100 feet per second, and
   c. quenching the resultant reaction mixture after carbon formation has occurred.

2. A process as defined in claim 1 wherein the initial direction of said injected streams of hydrocarbon liquid is substantially normal to the direction of flow of said exiting stream of hot combustion gases.

3. A process as defined in claim 1 wherein the combustion step (a) of the process is carried out under conditions to achieve substantially sonic velocity of the combustion gases as they leave the downstream end of the combustion zone.

* * * * *